(12) United States Patent
Fero

(10) Patent No.: US 6,863,329 B2
(45) Date of Patent: Mar. 8, 2005

(54) ONE PIECE VEHICLE STORAGE COMPARTMENT

(75) Inventor: Mark W. Fero, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/263,543

(22) Filed: Oct. 3, 2002

(65) Prior Publication Data

US 2004/0066053 A1 Apr. 8, 2004

(51) Int. Cl.⁷ .................................................. B60R 7/00
(52) U.S. Cl. ...................................................... 296/37.8
(58) Field of Search ............................ 296/37.8, 37.12, 296/37.13

(56) References Cited

U.S. PATENT DOCUMENTS

| | | | | |
|---|---|---|---|---|
| 4,171,151 A | * | 10/1979 | Luck .......................... 312/236 |
| 4,427,215 A | * | 1/1984 | Weichenrieder et al. . 296/37.12 |
| 4,552,399 A | | 11/1985 | Atarashi |
| 5,197,775 A | * | 3/1993 | Reeber ..................... 296/37.12 |
| 5,213,243 A | | 5/1993 | Landon |
| 5,297,709 A | * | 3/1994 | Dykstra et al. ........... 296/37.12 |
| 5,431,442 A | * | 7/1995 | Tomita et al. ............ 296/37.12 |
| 5,715,966 A | * | 2/1998 | Nagano et al. ............. 296/37.8 |
| 5,743,585 A | * | 4/1998 | Pranger et al. ........... 296/37.12 |
| 5,810,414 A | * | 9/1998 | Choquet ................... 296/37.12 |
| 6,045,173 A | * | 4/2000 | Tiesler et al. .............. 296/37.8 |
| 6,106,043 A | | 8/2000 | Izumo |
| 6,129,401 A | | 10/2000 | Neag et al. |
| 6,135,530 A | * | 10/2000 | Blaszczak et al. ........ 296/37.12 |
| 6,164,711 A | | 12/2000 | Neal et al. |
| 6,176,534 B1 | * | 1/2001 | Duncan .................... 296/37.12 |
| 6,206,442 B1 | | 3/2001 | Breunig |
| 2002/0171018 A1 | * | 11/2002 | Harada ...................... 248/311.2 |
| 2002/0195831 A1 | * | 12/2002 | Hogan et al. ............. 296/37.12 |
| 2003/0001402 A1 | * | 1/2003 | Sawatani et al. ......... 296/37.12 |

FOREIGN PATENT DOCUMENTS

JP           4-356241           12/1992

* cited by examiner

Primary Examiner—Lori L. Coletta
(74) Attorney, Agent, or Firm—Bill C. Panagos

(57) ABSTRACT

A vehicle storage compartment includes a door with an interior face and exterior face. The exterior face of the door faces the interior of a vehicle. The vehicle storage compartment also includes a panel connected to the door, wherein the panel and the interior face of the door define a bin for the storage of goods. The panel is integrally formed with the door in a molding operation to form a single component. The vehicle storage compartment door and bin wherein are integrally formed by a counter-pressure molding process such that cell structures are formed in an interior of walls forming the door and the panel.

9 Claims, 3 Drawing Sheets

ONE PIECE VEHICLE STORAGE COMPARTMENT

BACKGROUND OF THE INVENTION

This invention relates in general to a vehicle storage compartment or a glove box, and more particularly to an improved method of constructing a glove box.

Most vehicles in use today have compartments for storage positioned within the passenger compartment. Many of these compartments include a housing and a separate door panel that is movable between an open and closed position. These are typically separately formed by an injection molding process. Usually some type of latching mechanism is also used for locking the door in the closed position. These compartments can be large or small and are generally adapted for storing maps, flashlights, gloves, compact discs, and other accessories related to the convenience and travel needs of the driver. Many of these storage compartments are positioned on the console or instrument panel of the vehicle, and typically within the armrest or glove box areas of the passenger compartment.

To ensure proper operation of the storage compartments, each of the components described above must be properly positioned and secured together. Improper positioning can cause aesthetic concerns including undesirable gaps between the door panel and housing and operational problems such as binding or excessive play between the elements. A common problem that results from improper positioning includes annoying rattles and squeaks. These problems usually increase over time due to vibrations in the vehicle while driving, or even under normal use of the storage compartments. Due to the precision required in assembling the components of the storage compartments, the initial positioning and fastening of glove box elements is important. Because of this, movement of the components over time has proven to be a difficult problem to address.

Also, due to the constant contact these compartments have with the vehicle occupants, the outer covers generally need to be sturdy and durable. Importantly, especially with respect to a glove box, the storage compartment should be able withstand a knee impact, in the event that a passenger in the vehicle makes contact with the front panel of the glove box under normal use of the vehicle or under light impacts, such as with an accident, for example. This may prevent injury to the passenger by preventing the passenger from contacting the console and thereby causing greater injury. Federal Motor Vehicle Safety Standards have been put in place to assure the ability of the glove box to withstand a knee impact.

Typically, the storage compartments have been formed from separate components, as described above, and joined together. The methods of joining the components together can include using fasteners, welding, epoxy, and heat. These methods have been suitable in the past, however, it would be beneficial to have a storage compartment that has a reduced number of components for easier manufacture and, therefore, cost savings, while retaining the structural requirements for a knee impact event.

SUMMARY OF THE INVENTION

This invention relates to a vehicle storage compartment includes a door with an interior and exterior face. The exterior face of the door faces the interior of a vehicle. The compartment also includes a panel connected to the door, wherein the panel and the interior face of the door define a bin for the storage of goods. The panel is integrally formed with the door in a molding operation to form a single component. The storage compartment door and bin wherein are integrally formed by a counter-pressure molding process such that cell structures are formed in an interior of walls forming the door and the panel.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
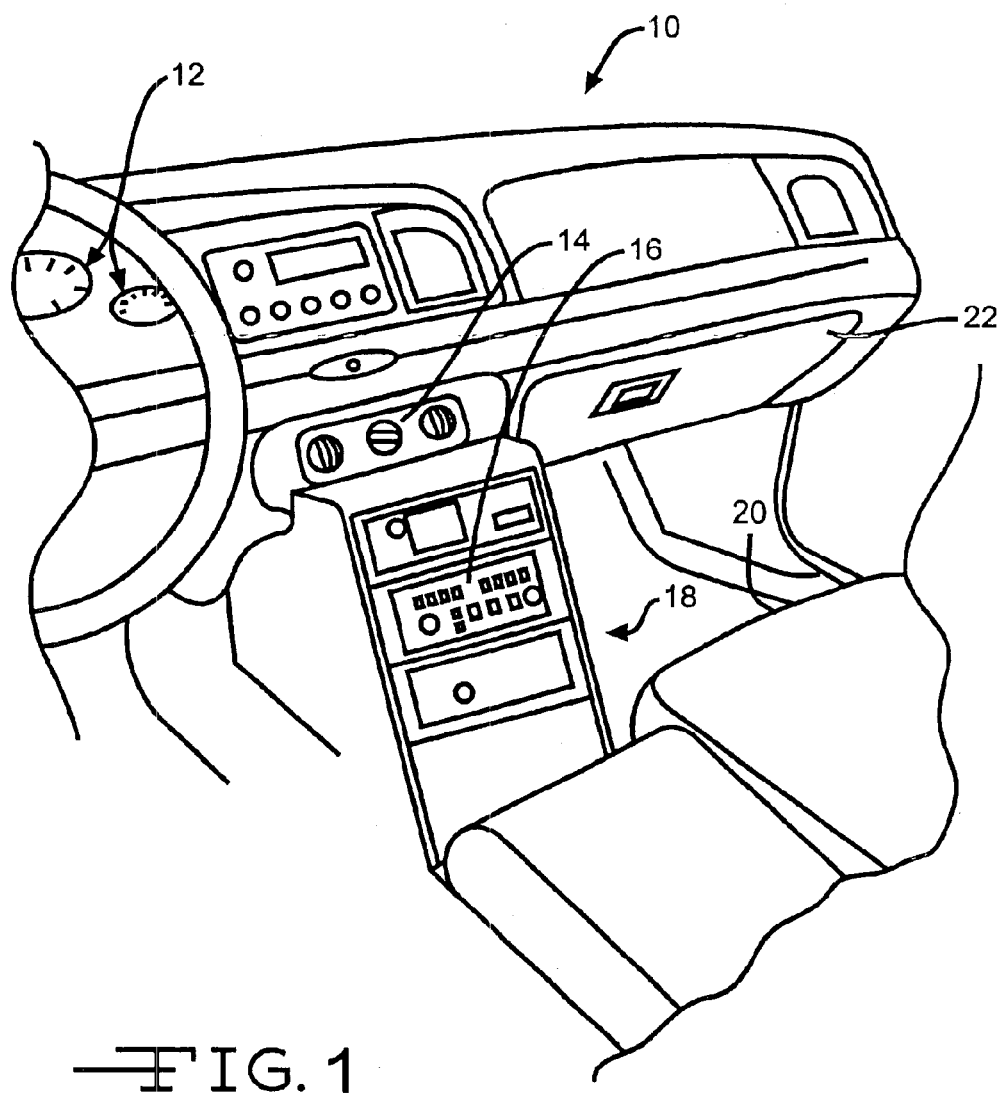
FIG. 1 is a view of a vehicle instrument panel.

Referring now to the drawings, there is illustrated in FIG. 1 a vehicle instrument panel 10, also commonly referred to as a dashboard. The instrument panel typically contains an instrument cluster (including dials and gauges) 12 for the benefit of the driver displaying information about the performance of the vehicle, such as speed, R.P.M., oil temperature, fuel indicator, etc. There are usually also climate controls 14, audio/stereo controls 16 and storage compartments 18. Most instrument panels 10 include a storage compartment 22 that is positioned near or in front of the passenger seat 20 in the vehicle. The storage compartment 22 is adapted to be opened and closed. The storage compartment shown is commonly referred to as a glove box. However it should be understood that the present invention can be practiced with any storage compartment in a vehicle such as an armrest storage compartment, cup holder, overhead bin, etc.

Figure 2:
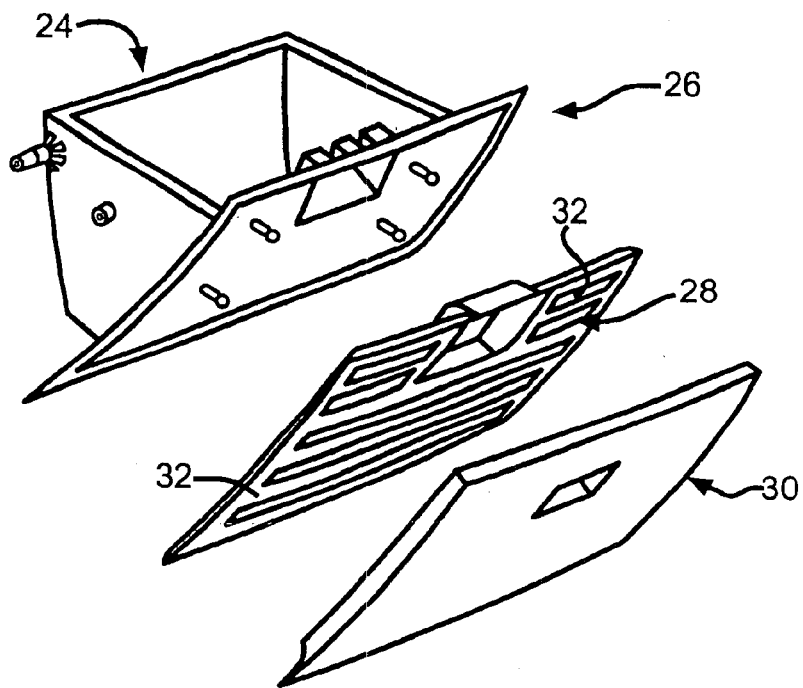
FIG. 2 is an exploded perspective view of a prior art glove box design using a three-piece construction.

Illustrated in FIG. 2 is an exploded view of one example of a prior art glove box 24. The glove box 24 illustrated is formed from three main components including a storage bin 26, a reinforcement member 28 and an outer door 30. The storage bin 24 is usually made of plastic and is pivotably mounted in or on a vehicle console. The reinforcement panel, which has been made of plastic or metal is positioned between the door 30 and the bin 26. The reinforcement panel 28 acts as structural support in the event of a knee impact. Therefore, the panel 28 includes integral ribs 32 to give the panel 28 structural stability. The panel 28 can be heat staked to the storage bin. The outer door 30 is usually made of or covered by material that corresponds to the outer covering material of the console 10 for an aesthetically pleasing appearance. If a door covering is used, the inner door material is usually made of metal or plastic. The door 30 is vibration welded to the bin 26, with the reinforcement panel 28 positioned therebetween.

Figure 3:
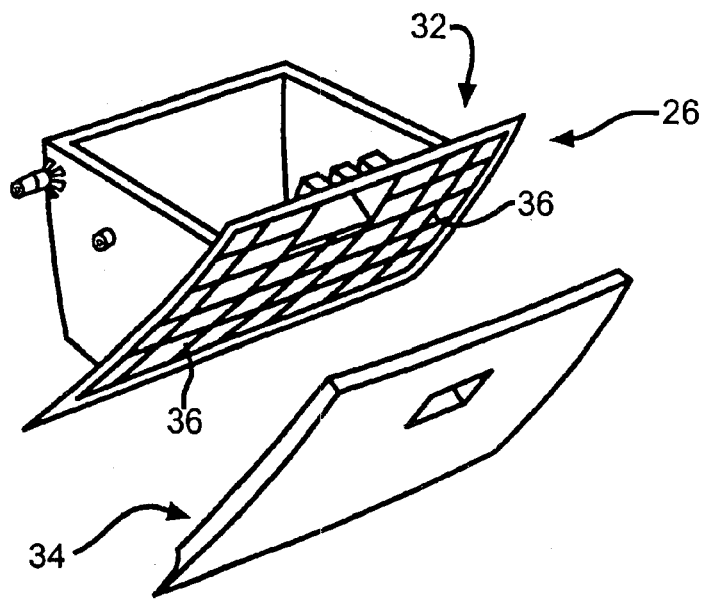
FIG. 3 is an exploded perspective view of a prior art glove box design using a two-piece construction.

Shown in FIG. 3 is an exploded view of a second prior art glove box 32. The illustrated box is formed from two components including a storage bin 26 and an outer door 34. The storage bin 32 has reinforcing ribs 36 formed directly on the front face of the bin 34 instead of the intermediate reinforcement panel 28 of the example shown in FIG. 2. The outer door 34 can then be vibration welded to the bin 26 to form the glove box 32. As described above, the glove box 32 can be pivotably mounted with a vehicle console. As described below, if a thicker door is desired, forming the storage compartment using a conventional injection molding process can result in "sink marks". Additionally, with integral ribs formed on the front face of the bin, it is possible for the ribs to show through after the injection molding process is completed.

Using a conventional injection molding process with this design of the glove box 24 or 32 can cause what are commonly known as "sink marks". A conventional injection molding operation introduces a molten material into a cavity formed by one or more mold dies. The molten material is then cooled such that the density of the material is essentially the same throughout the material, including the outer surfaces. With glove box designs that utilize a relatively thick door 30, an injection molding process is more likely to cause "sink marks". This is due to the higher internal temperature of the polymer during the molding process. Because the internal material cools at a slower rate than the skin or outer portion of the molded body, the internal material tends to settle. This cooling and settling effect can cause "sink marks" on the face portion of the glove box. These marks are undesirable since the face portion of the door 30 faces the passenger compartment of the vehicle. Additionally, the joining of multiple components can result in loose or improper fit, the elements can loosen over time, and cause other cosmetic problems as described above.

Figure 4:
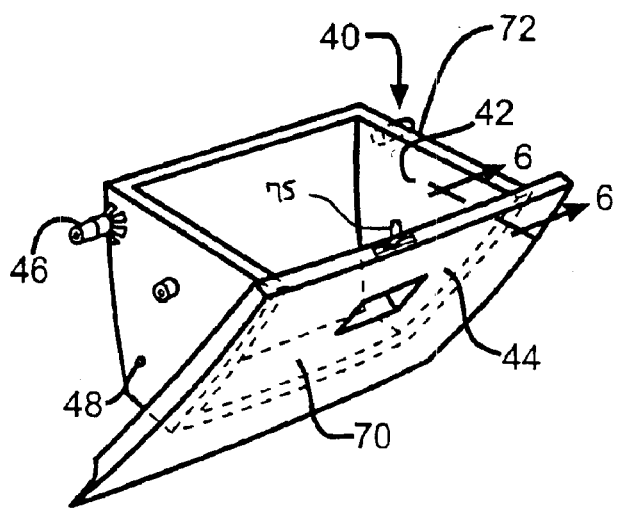
FIG. 4 is a perspective view of the storage compartment in accordance of the present invention.
Figure 5:
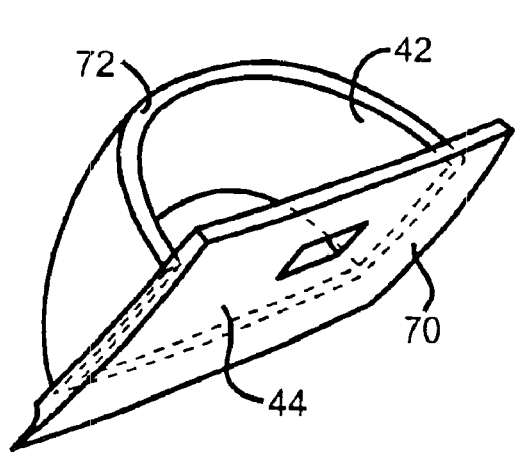
FIG. 5 is a perspective view of an alternate embodiment of a storage bin in accordance with the present invention.
Figure 6:
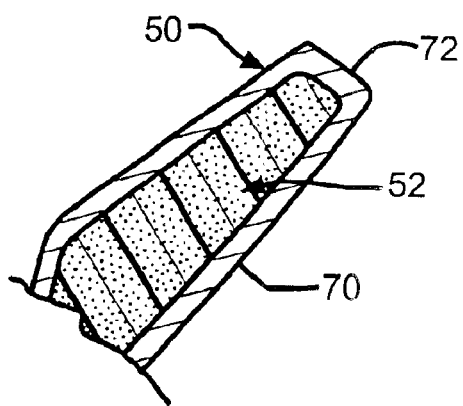
FIG. 6 is a cross-sectional view of the storage compartment door illustrated in FIG. 4 along line 6—6.

Illustrated in FIG. 4 is a perspective view of a storage compartment or glove box 40 of the present invention. The box 40 has a storage bin portion 42 and a door portion 44 integrally formed together. The bin 42 forms three sides of the glove box 40 with the door 44 forming the fourth side. There can also be a base panel, or the side panels could be shaped such that they form the base of the bin. It should be understood that the glove box can have a single panel that forms the body of the bin 42, as seen in FIG. 6. Alternatively, the body of the bin can have a triangular shape with there being two panels that meet at a first point and connect to the door at second points. Regardless of the shape of the bin, the side panels essentially define the edges 72 of the bin. The glove box 40 is preferably formed as an integral single unit with all the components formed simultaneously. The glove box 42 is preferably sized and shaped to fit into a console 10 of any vehicle. The door 44 also preferably includes a latch mechanism 75 that is preferably connected with the door 44 of the glove box 40 such that the glove box 40 can be released relative to the console 10. When released, the glove box 40 can be pivoted about a pin, such as pin 46. The latch mechanism 75 preferably engages the console 10 such that when engaged, the door 44 will be locked with the console 10. Since the bin 42 and door 44 form a single unit, as will be described below, when the latch mechanism 75 is released the bin 42 and the door 44 both pivot together about the pin 46. Alternatively, the pin 46, can act as a tab that slidably engages a track (not shown) formed in the console 10. The glove box 40 could then pivot about the lower portion of the bin 42. The pivot 48 preferably is pivotably connected to the console 10 by any means such that the glove box 40 can pivot relative to the console 10 about the pivot 48. In this embodiment, the pin 46 could act like a stop when engaged with the end of the track so that the glove box 40 does not fall out of the console completely.

The bin portion 42 and the door portion 44 of the glove box are preferably formed by a counter pressure molding process in accordance with the present invention. Shown in FIG. 6 is a sectional view of the door 44 of the present invention through line 6—6. The outer cover 50 of the door 44 is preferably a polymer resin. The internal cellular structure 52 of the door 44 is formed during the pressure molding process. Counter-pressure molding generally includes the introduction of a chemical blowing agent (also known as a foaming agent) with a polymer. The blowing agent and polymer can be blended or fed separately into a mold. In a preferred embodiment, the blowing agent is premixed with the polymer and introduced into the mold together. The percentage of blowing agent used usually depends on the thickness of the "foam" needed. Additionally, the more blowing agent that is used, the greater the counter pressure is required to contain the growth of the cellular structure 52. The temperature of the injection process activates the blowing agent which creates an internal pressure within the polymer that is less than the initial mold cavity pressure. The combination of higher cavity pressure, and lower internal blowing pressure keeps the "foamed" cellular material away from the outer, skin surfaces (including the exterior surface 70) which would give the door a poor appearance. The heat causes a thermal decomposition of the blowing agent material. The decomposition may be either endothermic or exothermic. Endothermic blowing agents generally primarily produce $CO_2$ while exothermic agents generally primarily generate $N_2$. The type of blowing agent used generally depends on the application and type of polymer being used, and thus can vary greatly. The gases created by the blowing agents create a cellular structure 52 with a generally smooth solid skin around a fine cellular core. At the same time, the molten polymer cools as it contacts the mold thereby forming the outer "skin" portion 50 of the door. This controlled reaction provides an "as molded" surface finish on an exterior face or surface 70 facing the vehicle interior and eliminates the need for secondary paint finishes. Since the face of the glove box is readily viewable by occupants of the vehicle, it is advantageous for the glove box door 44 to have a good cosmetic appearance. The mold can implement any type of design, such as a textured design. Therefore, the exterior surface 70 of the door will take on a textured "as molded" appearance during the molding process.

In addition to the door 44 having a good appearance, the required structural integrity is also met by using the counter-pressure molding method. The presence of the cell structures 52, having the trapped gas therein, provides a relatively rigid structure as compared to a panel having the same amount of plastic material but having a reduced thickness. Therefore, neither integral ribs or a reinforcement panel is generally required. This reduces the number of parts that are required to form the glove box. Therefore, the weight of the glove box 40 and the costs to construct the glove box are both reduced. Also, since no further finishing is required, a time savings is achieved as well. Additionally the counter pressure molding method does not prohibit a thicker door 44 design as does the conventional injection molding process as described above. Due to the blowing agent and the formation of the cell structure 52, there is essentially no sinking effect in the internal structure of the glove box 40.

In an alternate embodiment, the storage compartment 40 is made having integrally formed bin 42 and door 44 portions. However, in this embodiment the bin 42 is made by a conventional injection molding process and the door 44 is made by the counter-molding process described above. This can be accomplished by a process wherein the bin material is injected into a mold (not shown) at a first location. The material that forms the door 44 and the internal cell structure 52 can be injected into the mold at a second location. The material for the door 44 would be subjected to the foaming or blowing agent as described above. Therefore, the bin 42 and door 44 are molded integrally to form the storage compartment 40, with the door 44 having the preferred external skin 70 and having the internal cell structure 52.

In accordance with the provisions of the patent statutes, the principle and mode of operation of this invention have been explained and illustrated in its preferred embodiment.

However, it must be understood that this invention may be practiced otherwise than as specifically explained and illustrated without departing from its spirit or scope.

What is claimed is:

1. A vehicle storage compartment comprising:
    a door with an interior face and an exterior face, said exterior face facing the interior of a vehicle; and
    a panel connected to said door, wherein the panel and the interior face of the door define a bin for the storage of goods;
    wherein said panel is integrally formed with said door in a molding operation to form a single component, said door being rigid and having cell structures formed therein to provide treater rigidity of said door.

2. The vehicle storage compartment defined in claim 1 wherein a plurality of sides defines edges of the bin.

3. The vehicle storage compartment defined in claim 2 further comprising a base panel wherein said base panel, said sides and said door define the boundaries of the bin.

4. The vehicle storage compartment defined in claim 3 wherein the bin has a generally rectangular shape.

5. The vehicle storage compartment defined in claim 1 wherein said panel is formed by an injection molding process and said door is formed by a counter-pressure molding process.

6. A vehicle storage compartment comprising:
    a door with an interior face and an exterior face, said exterior face facing the interior of a vehicle; and
    a panel connected to said door, wherein the panel and the interior face of the door define a bin for the storage of goods;
    wherein said panel is integrally formed with said door in a molding operation to form a single component, said door being rigid and having cell structures formed therein to provide greater rigidity of said door;
    wherein said panel is formed by an injection molding process and said door is formed by a counter-pressure molding process, and wherein the door and the panel are formed simultaneously.

7. The vehicle storage compartment defined in claim 1 wherein the door and the panel are formed by a counter-pressure molding process such that cell structures are formed in an interior of walls forming the panel.

8. A vehicle storage compartment comprising:
    a door with an interior face and an exterior face, said exterior face facing the interior of a vehicle; and
    a panel connected to said door, wherein the panel and the interior face of the door define a bin for the storage of goods;
    wherein said panel is integrally formed with said door in a molding operation to form a single component, said door having cell structures formed in an interior of walls forming the door;
    wherein the door and the panel are formed by a counter-pressure molding process such that cell structures are formed in an interior of walls forming the door, and wherein the cell structures are formed of the same material as the walls forming the door and the panel.

9. The vehicle storage compartment defined in claim 8 wherein the cell structures are formed simultaneously with the door and the panel.

* * * * *

UNITED STATES PATENT AND TRADEMARK OFFICE
CERTIFICATE OF CORRECTION

PATENT NO. : 6,863,329 B2
DATED : March 8, 2005
INVENTOR(S) : Mark W. Fero

It is certified that error appears in the above-identified patent and that said Letters Patent is hereby corrected as shown below:

Column 5,
Line 14, delete "treater" and insert -- greater --.

Signed and Sealed this

Twenty-fourth Day of May, 2005

JON W. DUDAS
*Director of the United States Patent and Trademark Office*